(12) United States Patent
Mononen et al.

(10) Patent No.: US 7,426,746 B2
(45) Date of Patent: Sep. 16, 2008

(54) LOCATION PRIVACY IN A COMMUNICATION SYSTEM

(75) Inventors: Risto Mononen, Espoo (FI); Sandro Grech, Helsinki (FI)

(73) Assignee: Nokia Corporation, Espoo (FI)

( * ) Notice: Subject to any disclaimer, the term of this patent is extended or adjusted under 35 U.S.C. 154(b) by 806 days.

(21) Appl. No.: 10/689,851

(22) Filed: Oct. 22, 2003

(65) Prior Publication Data
US 2005/0055576 A1    Mar. 10, 2005

(30) Foreign Application Priority Data
Sep. 4, 2003    (FI) .................................. 20031258

(51) Int. Cl.
*G06F 9/00* (2006.01)

(52) U.S. Cl. ................. 726/4; 726/3; 726/15; 380/270; 380/271; 380/258; 370/338; 455/404.2; 455/407; 455/411; 455/435.1

(58) Field of Classification Search ................. 380/258, 380/270–271, 259; 726/4, 18, 14–15; 713/160, 713/156; 455/432.1, 456.1, 433, 435, 404.2, 455/407, 411; 370/338, 352, 332, 349; 709/218, 709/230, 246
See application file for complete search history.

(56) References Cited

U.S. PATENT DOCUMENTS

| | | | |
|---|---|---|---|
| 6,760,444 B1 * | 7/2004 | Leung | 380/270 |
| 6,912,657 B2 * | 6/2005 | Gehrmann | 713/171 |
| 6,915,325 B1 * | 7/2005 | Lee et al. | 709/202 |
| 6,954,790 B2 * | 10/2005 | Forslow | 709/227 |
| 7,023,828 B2 * | 4/2006 | Korus et al. | 370/338 |
| 7,286,671 B2 * | 10/2007 | Yegin et al. | 380/270 |
| 2003/0093553 A1 | 5/2003 | Le et al. | |

FOREIGN PATENT DOCUMENTS

WO    WO 02/43427 A1    5/2002

OTHER PUBLICATIONS

Choi, et al.; "Practical Solution for Location Privacy in Mobile IPv6", Information Security Applications, 4th International Workshop, Aug. 25-27, 2003, 15 pages.

* cited by examiner

Primary Examiner—Thanhnga B Truong
(74) Attorney, Agent, or Firm—Squire, Sanders, & Dempsey L.L.P.

(57) ABSTRACT

A mechanism for providing a mobile node with reliable information for location privacy decisions in connection with an address update process that gives the correspondent node a chance to deduce the location of the mobile node is provided. According to one embodiment of the invention, an indication is given when an address update process needs to be performed for optimizing routing between a mobile node and a correspondent node. In response to the indicating step, the correspondent node may be authenticated, the authentication yielding identity information about the correspondent node. Based on the identity information, a route optimization decision may be made based on whether or not the address update process is to be performed, and the address update process may be carried out depending on the decision.

28 Claims, 3 Drawing Sheets

LOCATION PRIVACY IN A COMMUNICATION SYSTEM

BACKGROUND OF THE INVENTION

1. Field of the Invention

The invention relates generally to location privacy in a communication system. More particularly, the invention relates to a mechanism that allows a communicating party to prevent its whereabouts from being deduced by the opposite communicating party. The mechanism is mainly intended for Mobile Internet Protocol (IP) networks.

2. Description of the Related Art

The protocols related to IP networks, such as the Internet, are developed by the Internet Engineering Task Force (IETF). The IETF has also been developing support for mobile IP nodes for both versions of IP (i.e. for IPv4 and IPv6). The main results of this work are the two Mobile IP protocols, Mobile IPv4 (RFC 2002) and Mobile IPv6 (work in progress, assumed to reach RFC status soon).

Mobile IP defines a mechanism by which a mobile node can change its IP address without interrupting any ongoing sessions with communicating peers. When moving across IP subnets, the mobile node obtains a new IP address facilitated by an access router. The mobile node then informs its home agent (HA) and, optionally, also the correspondent node (CN) about the change in the address by sending the new address (so-called care-of address) in a message called Binding Update (BU) to the home agent and optionally also to the correspondent node. The association of the mobile node's permanent home address with the care-of address of the mobile node is termed binding.

Based on the Binding Update, the correspondent node and possible eavesdroppers may deduce, with certain accuracy, the geographic location of the mobile node. For protecting its privacy, the mobile node can control the sending of the Binding Updates, so that less trusted correspondent nodes will not be given the chance to obtain the location information. The current proposal (draft-ietf-mobileip-ipv6-23, Mobility Support in IPv6, May 2003) states that "a mobile node may also choose to keep its topological location private from certain correspondent nodes, and thus need not initiate the correspondent registration." The correspondent registration is a process during which a Binding Update is sent to the correspondent node, causing a binding for the mobile node to be registered at the correspondent node. However, the problem related to this is that the mobile node does not really have sufficient information for the decision on whether or not to initiate the correspondent binding procedure.

Typically, the IP address and the related DNS (Domain Name System) name are the only identities of the correspondent node that the mobile node is aware of. The usability of these identities for verifying the identity of the correspondent node is, however, questionable for the following reasons. First, the IPv6 address is a 128-bit string and thus too hard to memorize for a human user. An identifier that is hard to memorize easily makes the user dubious about the trustworthiness of the correspondent node, and when dubious the user tends to omit the correspondent registration, in which case the routing between the two nodes remains unoptimized. This, in turn, causes overhead in the network. Second, the DNS is not a part of the MIPv6 architecture or trust model. Third, DNS data integrity cannot be trusted in today's Internet. The extensions to the Domain Name System, which are described in RFC 2535, try to improve the situation, but these extensions have not been taken into real use. Fourth, the correspondent node does not necessarily have a DNS name at all. This is the situation when a mobile correspondent node is away from its home network, for example.

SUMMARY OF THE INVENTION

The invention provides a mobile node with reliable information for location privacy decisions in connection with an address update process that gives the correspondent node a chance to deduce the location of the mobile node.

In the invention, an authentication process is introduced into the beginning of the correspondent registration process so that a mobile node (on the end-user's behalf), or the end-user, is given a chance to prevent the sending of the new address to the correspondent node, if the authentication process indicates that the correspondent node is not necessarily a trusted party. The authentication process is such that it yields at least one high-level identifier of the correspondent node. The high-level identifier may refer to an identifier that is easier for a human user to associate with a certain person or organization than a mere IP address. This identifier may be the e-mail address or the DNS name of the correspondent node, for example. After a successful authentication process the mobile node thus knows, in addition to the IP address, at least one high-level identifier of the correspondent node, which may significantly increase the mobile node's or the user's knowledge of the trustworthiness of the correspondent node. The decision on the continuation and completion of the correspondent registration process is therefore made only after the authentication process. As discussed below in connection with FIGS. 3 and 4, the high-level identifier may be cryptographically certified during the authentication process.

Thus one embodiment of the invention is the provision of a method for performing an address update in a communication system. The method includes the steps of indicating that an address update process needs to be performed, where location-related information about the mobile node is transmitted to the correspondent node if the address update process is performed, and authenticating the correspondent node in response to the indicating step. The authenticating step yields identity information about the correspondent node. The method also includes determining, based on the identity information, whether the address update process is to be carried out and performing the address update process when the determining step so indicates.

In another embodiment, the invention provides a mobile node for a communication system. The mobile node includes indicator means for giving an indication when an address update process needs to be performed, and authentication means for authenticating the correspondent node. The authentication means are responsive to the indicator means and yield identity information about the correspondent node. The mobile node further includes determination means, responsive to the authentication means, for determining whether the address update process is to be performed and address update means, responsive to the determination means, for carrying out the address update process.

In a further embodiment, the invention provides a system for performing address updates in a communication system. The system includes entities similar to the above functional entities of the mobile node, except that in the system of the invention the entities may be distributed between the mobile node and the network.

By means of the solution of the invention the mobile node can be provided with reliable identity information that allows a decision to be made on whether or not a correspondent registration can be performed when a need for the registration has been detected. The mobile node (or its user) may thus allow the correspondent registration to be carried out only when the identity information indicates that the correspondent node will not misuse the location information that is made available when the continuation is allowed.

A further advantage of the invention is that route optimization does not need to be omitted just because the mobile node or its user cannot recognize a trusted correspondent node. This decreases the overhead caused in the network.

Since the mobile node may reverse-tunnel any traffic through the home agent while the authentication is in progress, the authentication does not necessarily increase the set-up time for the session or disrupt an ongoing session. Since the authentication is needed only once during a session, the signaling performance of the mobile node is not affected in connection with subsequent address changes.

BRIEF DESCRIPTION OF THE DRAWINGS

In the following, the invention and many of its embodiments are described more closely with reference to the examples shown in FIG. 1 to 6 in the appended drawings, wherein.

DETAILED DESCRIPTION OF THE PREFERRED EMBODIMENTS

Figure 1:
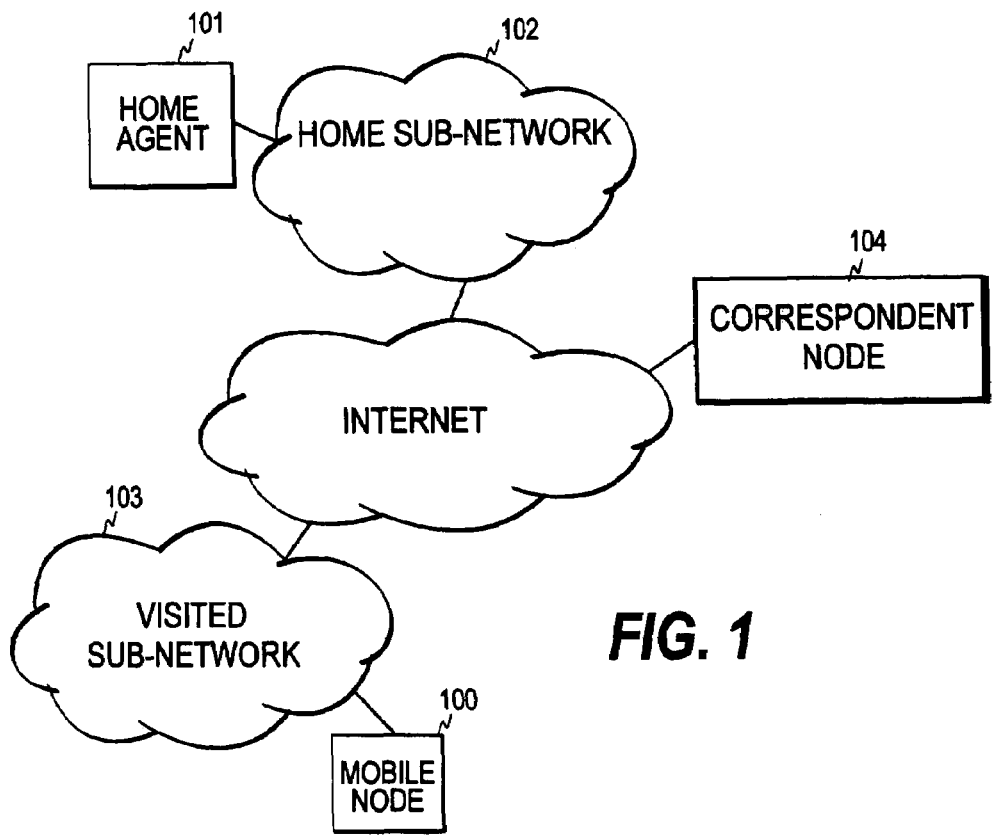
FIG. 1 illustrates an example of a communication environment in which the principles of the invention may be implemented.

FIG. 1 shows an example of a typical communication environment in which the invention can be applied. A mobile node 100, which may be, for example, an IPv6 compatible node, may be currently located in a foreign network 103 away from its home network 102. While being away from the home network, the mobile node is addressable at a so-called care-of address, which the mobile node has registered with its home agent 101 located in the home network. The association of the home address with the care-of address is termed "binding." When located outside its home network, the mobile node may use two different modes of communication when communicating with a correspondent node 104, which may be a mobile node or a fixed node. In the first mode the traffic may travel via the home agent: packets originated from the correspondent node may be routed to the home agent and then tunneled, utilizing the registered binding, to the mobile node. While the packets originated from the mobile node are first reverse-tunneled to the home agent, the packets are then routed to the correspondent node. In the second mode the mobile node may register its current binding with the correspondent node by sending a message called Binding Update (BU) to the correspondent node. Consequently, packets from the correspondent node can be routed directly to the mobile node. As a result, the shortest communication path between the mobile node and the correspondent node can be used. The second mode and its initialization may also be referred to as route optimization. Route optimization may be most beneficial when the corresponding node is close to a roaming mobile node, i.e. when the difference between the optimized and unoptimized routes is great. The difference may be measured as the difference in the number of intermediate nodes.

As discussed above, the correspondent node and possible eavesdroppers may, with certain accuracy, deduce, based on the BU, the geographic location of the mobile node. In the invention the mobile node may be provided with additional identity information for making the decision on whether the location of the node is to be kept private from the correspondent node when there is a need for route optimization. This may be accomplished by introducing an authentication process before the route optimization procedure with the correspondent node. The authentication process yields reliable higher-level identity information about the correspondent node for the mobile node and/or its user, and the outcome of the authentication process may stipulate whether route optimization towards the correspondent node should be performed.

Figure 2:
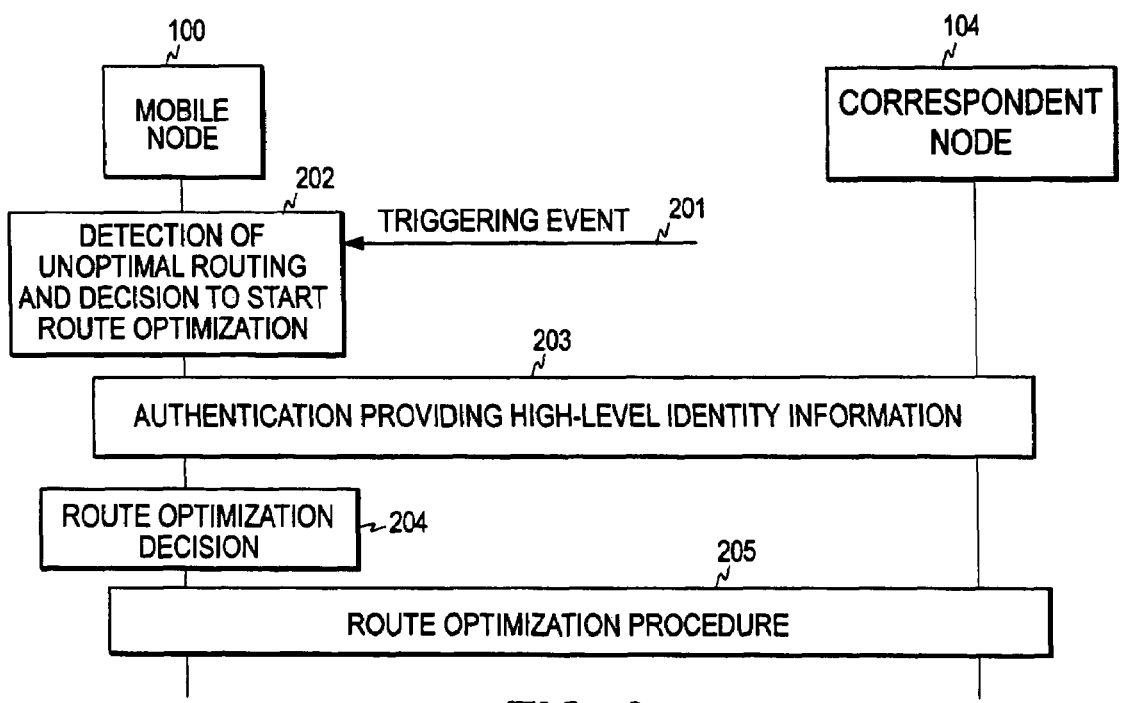
FIG. 2 illustrates the introduction of the authentication process into a route optimization procedure.

FIG. 2 illustrates an example of the introduction of the authentication process before the route optimization procedure. When a mobile node 100 detects that routing is not optimized with respect to a correspondent node 104, mobile node 100 may make a decision to start a registration process in order to optimize the route (step 202). The decision to start the route optimization process may be made in the Mobile IP layer of the node, and various events 201 may trigger the decision. For example, reception of a packet routed unoptimally through the home agent may trigger the registration process. Another possible registration trigger may be the occurrence of a Mobile IP handover to a new care-of address when the mobile node 100 moves in the access network and the network signals the new care-of address to the mobile node. In response to the decision to start the correspondent registration, authentication of the correspondent node may first be started (step 203) in order to check whether the registration process can be completed. The authentication process may be such that it yields, in addition to the IP address of the correspondent node, additional high-level identity information about the correspondent node. Based on this information, the mobile node or its user may then make a route optimization decision (step 204), i.e. the mobile node decides whether the registration process can be completed or not. If the high-level information indicates that the correspondent node is a trusted party, the mobile node may initiate a route optimization procedure with the correspondent node (step 205). In the opposite case the mobile node may decide to stop the registration process in order not to reveal its care-of address to the correspondent node. At this stage the user may also be prompted to decide whether to continue the registration process. The authentication and the route optimization decision may be performed only once during a session, i.e. there may not be a need to repeat the authentication procedure if the care-of address of the mobile node changes after the correspondent node has already been successfully authenticated.

In the invention, the correspondent node may thus be authenticated when a need to perform correspondent registration (i.e. route optimization) is detected. Depending on whether it is defined that this detection belongs to the route optimization or that the route optimization is a separate process started only after this detection, the invention may also be defined in two ways. First, if the detection is regarded as part of the route optimization, the start of the authentication process may freeze the route optimization and that the route optimization may be continued only if the route optimization decision made on the basis of the authentication process allows the continuation. Second, if the detection is not regarded as part of the actual route optimization, that the actual route optimization may be started conditionally, depending on the outcome of the authentication process.

The higher-level identity information obtained about the correspondent node may vary depending on the authentication protocol used. Although any authentication protocol that yields a trusted high-level identity of the correspondent node may be used, it is preferable to utilize authentication protocols that can be widely used for other purposes as well. Examples of such "general-purpose" authentication mechanisms are certificate-based authentication protocols, which are based on digital certificates that typically include at least a Distinguished Name (DN) and an associated public key. If the correspondent node is a mobile node, the certificate may be a subscriber certificate issued by the mobile operator, for example. However, if the correspondent node is a server, the certificate is typically issued by another Certification Authority (CA).

The session between the mobile node and the correspondent node may be initiated by either of the parties. In a mobile node initiated session the mobile node may start the session by sending at least the first packet as reverse-tunneled through the Home Agent and may start route optimization only later, in response to the triggering event. Alternatively, the mobile node may decide to start the route optimization before any other communication occurs with the correspondent node. In this case the authentication process is thus started before any packets are sent to the correspondent node. If the correspondent node initiates the session, it may obtain the home address of the mobile node as a result of a DNS query. The first packet(s) sent by the CN may thus be routed through the home agent of the mobile node.

In all cases, the signaling for certifying the identity of the correspondent node may be reverse-tunneled through the home agent in order not reveal the care-of address to the CN during the authentication process. While the authentication is in progress, the mobile node may reverse-tunnel any traffic through the home agent so that the authentication neither increases the set-up time for the session nor in any way disrupts an ongoing session.

Figure 3:
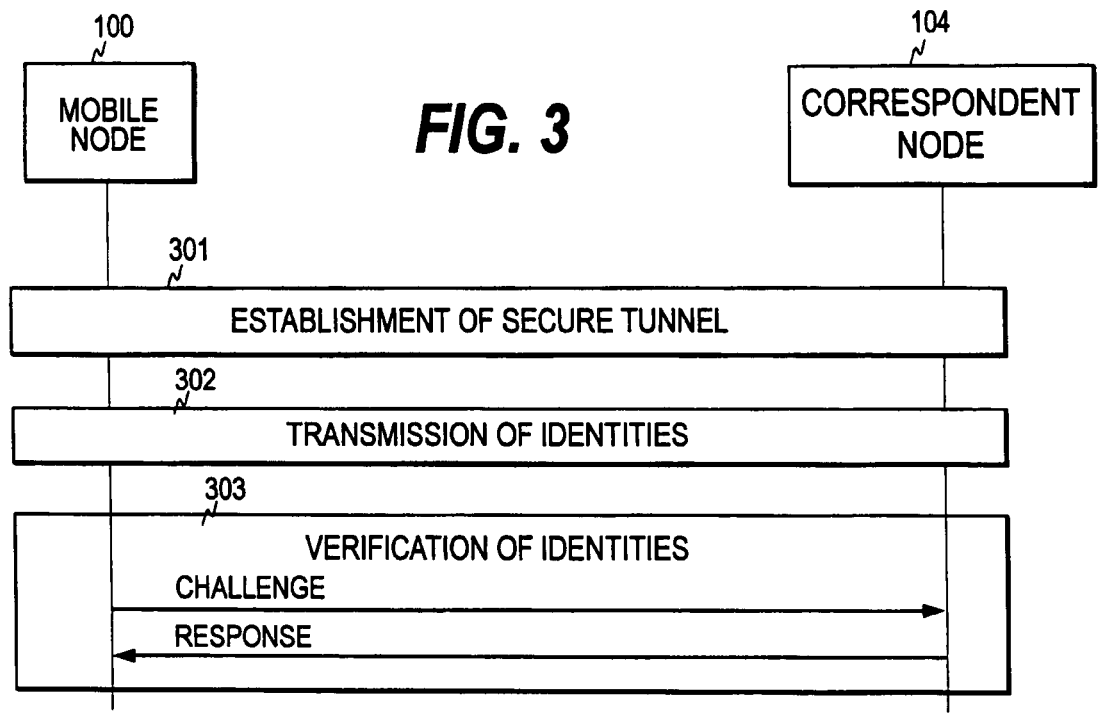
FIG. 3 illustrates the main steps of the authentication process of one embodiment of the invention.

FIG. 3 illustrates the main steps of an authentication process 203 according to one embodiment of the invention. This embodiment is based on the Internet Key Exchange (IKE) authentication protocol, which supports certificate-based authentication protocol among other mechanisms. The IKE is defined in RFC 2409. The following example is based on the draft of version 2 of the IKE, draft-ietf-ipsec-ikev2-08.txt.

Logically, the IKE-based authentication process may be divided into three successive stages. In the first stage (301) shown in FIG. 3, a secure communication pipe may be established between the mobile node and the correspondent node by means of the known Diffie-Hellman key exchange. In this first step session specific keys (SK) may be created so that confidentiality and integrity can be protected during subsequent communication between the two parties. Integrity protection prevents third parties from modifying the IKEv2 messages and from inserting messages into the IKEv2 negotiation. Confidentiality protection may be needed to protect the privacy of the communicating parties (among other things).

In the second step 302 in FIG. 3, the two parties inform each other about their identities. At this stage, the identity may only be claimed and the receiving party may not yet be able to verify the identity of the sending party. Public key certificates may be used as a tool for verifying the identity in the next, third step. The certificate may bind the identity with the public key.

The third step 303 may include of a random challenge and a verifiable response to that challenge. When not using extended authentication, the peers may be authenticated by having each sign a block of data (cf. chapters 2.15 and 2.16 in the IKEv2 draft). Alternatively, a shared secret can be used as the key. The data block, i.e. the challenge, may be a concatenation of octets from the earlier messages, the value of the nonce payload (Ni, Nr) and the value of the pseudo random function (prf) over certain message fields. The signature, i.e. the response, may use a cryptographic algorithm and a secret key to ensure that only the correct identity can give the correct response to the challenge. In the case of public key certificates, the private key may be used for signing and the public key may be used for verifying the signature. A successful response proves that the signer holds the private key matching the public one in the certificate. Therefore the signer's identity must be the one claimed in the certificate. Since the public/private key pair is unique and the private part is not known to outsiders, outsiders are not able to calculate the correct response.

Figure 4:
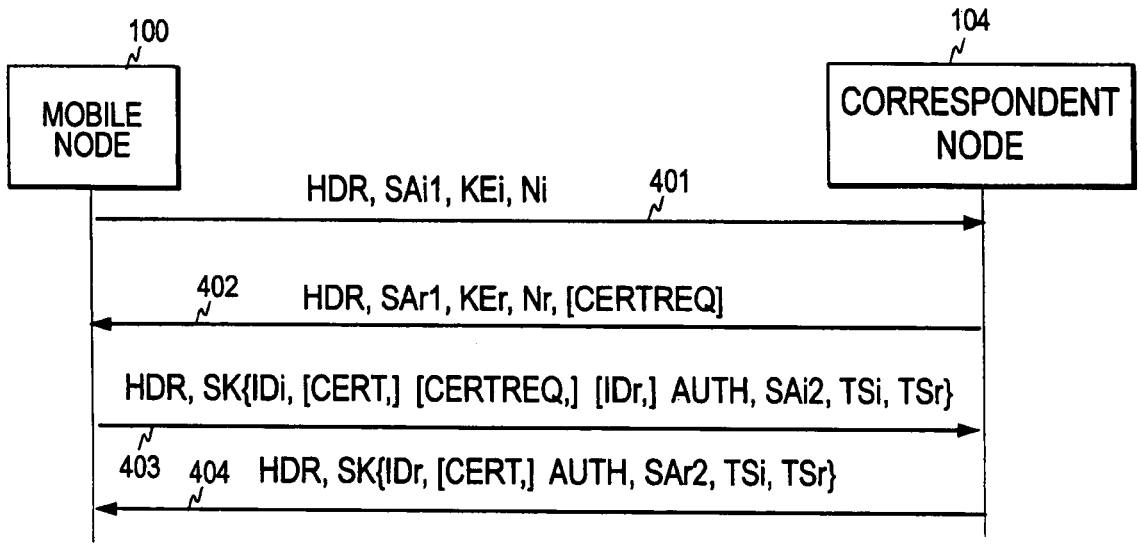
FIG. 4 illustrates an example of an authentication process based on the Internet Key Exchange (IKEv2) authentication protocol.

The above outline may also be valid for the Transport Layer Security (TLS) handshake protocol. In the actual IKEv2 message exchange illustrated in FIG. 4, the above outline discussed regarding the embodiment of FIG. 3 may not be that clearly visible, since the messages carry information that is relevant to more than one of the above steps, in order to minimize the number of roundtrips in the message exchange. This may result in two request-reply pairs 401/402 and 403/404, while a straightforward, unoptimized implementation of the above three main steps may result in three message pairs, i.e. a message pair for each of the main steps. In the messages shown in FIG. 4, the term "HDR" refers to the IKEv2 header, the terms "i" and "r" refer to the initiator and the responder, respectively. The notation "SK{ }" indicates that the payload between the curly brackets is encrypted and integrity protected using the security keys that were agreed during the Diffie-Hellman exchange in steps 401/402. The other abbreviations in FIG. 4 refer to IKEv2 payloads as follows: SA refers to Security Association, KE to Key Exchange, ID to Identity, CERT to certificate, CERTREQ to Certificate Request, AUTH to Authentication, Ni to Initiator nonce, Nr to Responder nonce, TSi to Initiator Traffic Selector, and TSr to Responder Traffic Selector. The contents of the above messages are disclosed in more detail in the above-mentioned current draft of IKEv2.

The mobile node may also verify the current status of the certificate from an external server, such as an Online Certificate Status Protocol (OCSP) server. Furthermore, various trust models may be utilized, which provide interoperator trust propagation, so that certificates of roaming parties can be trusted.

Figure 5:
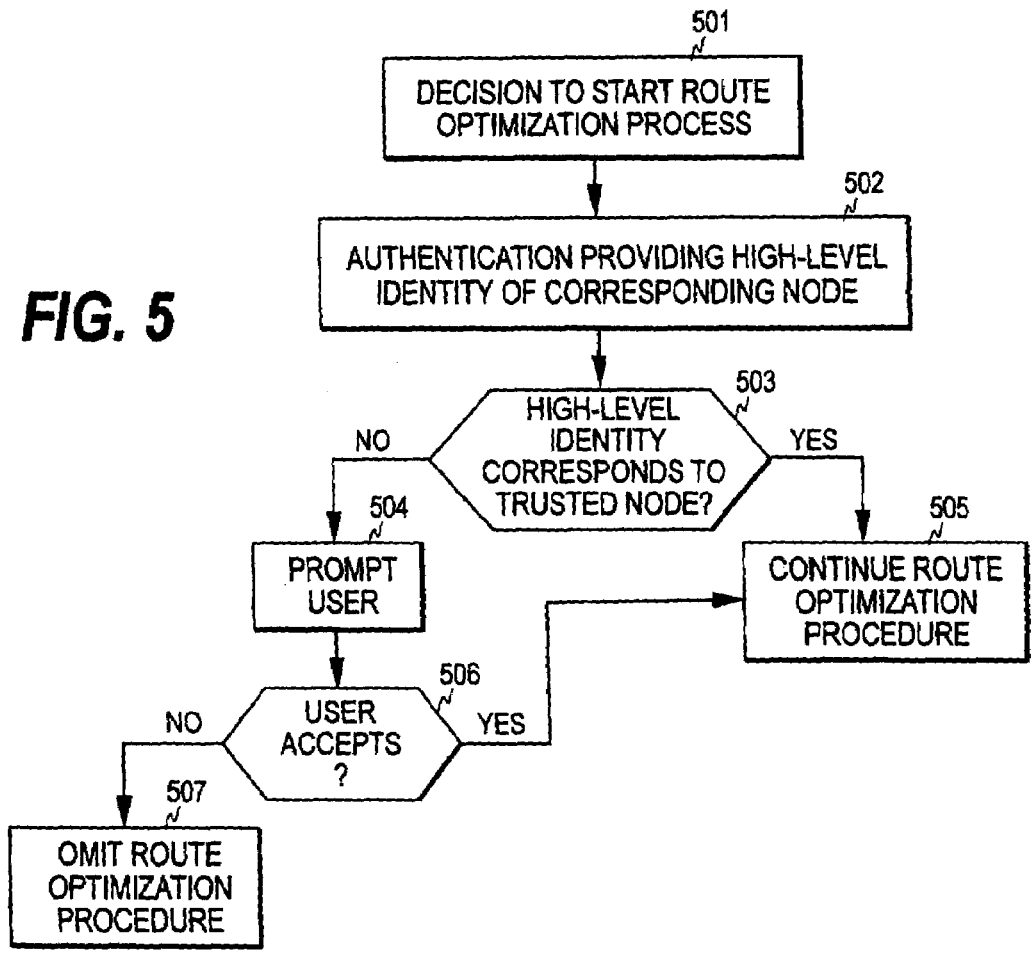
FIG. 5 is a flow diagram illustrating one embodiment of the operation of a mobile node in connection with route optimization.

FIG. 5 is a flow diagram illustrating one embodiment of the operation of the mobile node. When the mobile node makes a decision to initiate the route optimization process (step 501), the authentication process is started (step 502). As mentioned above, the decision to start the correspondent registration may be made in the Mobile IP layer in response to a triggering event. The authentication process yields at least one high-level identifier, which is then compared (step 503) with the content of a security policy database residing in the mobile node. The database may contain high-level identifiers of trusted hosts, or rules that indicate which identifiers represent trustworthy hosts. If the comparison with the database indicates that at least one high-level identifier obtained as a result of the authentication process represents a trusted host, the registration process is allowed to continue (step 505), and a BU is sent to the correspondent node. However, if the comparison indicates that the high-level identifier obtained does not belong to the group of trusted identifiers, the user of the mobile node may be prompted for a decision through the user interface of the node (step 504). A window containing the high-level identifier(s) obtained may be opened in the display of the mobile node. The text displayed in the window might be, for example, as follows: "You are about to reveal your local IP address to www.nokia.com. This information may be used to deduce your current location. Do you want to proceed?". If the user wants to proceed, i.e. if the user regards the high-level identity (www.nokia.com) as a trusted party, the registration may be allowed to continue, whereby a BU message is sent to the correspondent node. The security policy database may also be updated to include the identity that the user regarded as a trusted party. If the user does not want to proceed, the registration process may be stopped (step 507), in which case no BU message is sent.

As is obvious from the above, the process carried out in the mobile node corresponds otherwise to normal correspondent registration, but an additional phase has to be passed prior to the sending of the update message, the trustworthiness of the correspondent node being tested in the additional phase.

Figure 6:
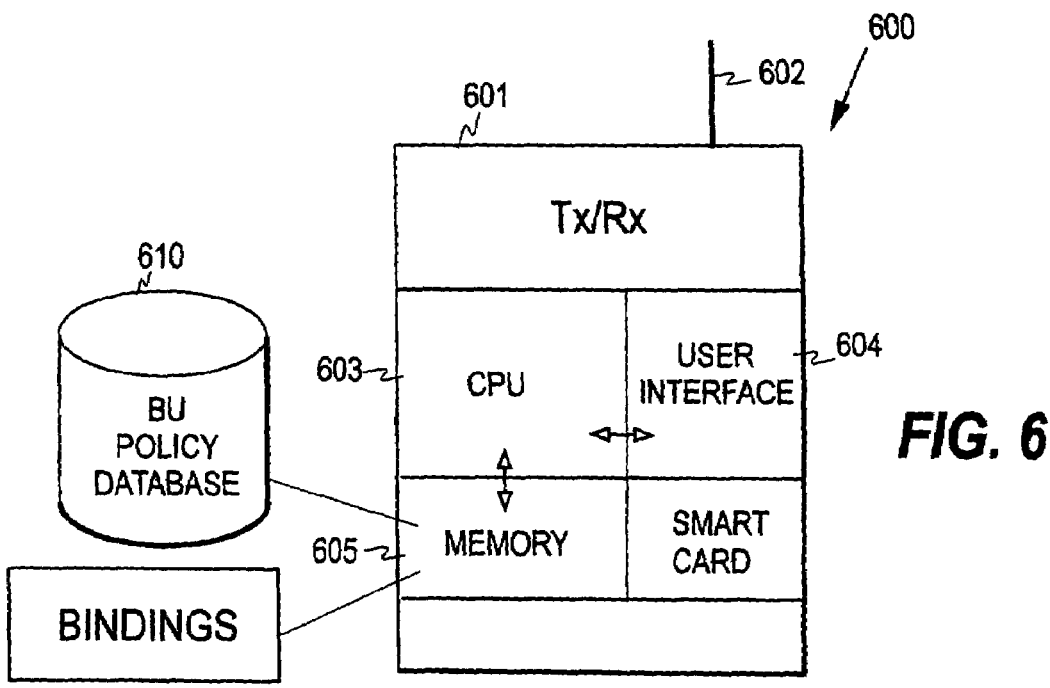
FIG. 6 is a block diagram illustrating the basic elements of the terminal according to one embodiment of the invention.

FIG. 6 illustrates the basic elements of the terminal according to one embodiment of the invention. The mobile terminal 600 may include a transceiver 601 provided with at least one antenna 602, a control unit 603, user interface device 604 for creating a user interface through which the user can operate the terminal, and memory device 605, which may include one or more smart cards 606, such as a SIM card. The memory device may further include the bindings and the security policy database 610 that includes information needed for secure communications. As to the correspondent registration, the database may contain the high-level identifiers of trusted hosts, or rules that indicate which identifiers represent trusted hosts. The control unit may compare the high-level identifier (s) obtained from the correspondent node with the content of the database, and handles, by controlling the user interface, the user interaction that follows, if the comparison does not indicate that the correspondent node is a trusted party. The database rules may be implemented similarly as filtering rules are implemented in a firewall gateway, for example. In addition to the IP addresses and port numbers that are typical firewall policy information, the BU policy database 610 may contain higher protocol layer identities to be matched and the related BU actions to be taken: (risto.mononen@nokia.com, BU-ok), (*.mononen@kolumbus.fi, BU-ok), (*, BU-nok). The order of the rules and their precedence may follow the typical firewall policy database scenario. However, in the invention it may be preferable to prompt the user, if none of the database entries indicates whether the correspondent node is trusted or not. Furthermore, it may be preferable that the user may maintain the database by inputting new high-level identities that represent trusted hosts, or by otherwise changing the content of the database through the user interface of the node. The control unit may further handle the binding update process if an affirmative route optimization decision is made (either by the user or the control unit itself). It may also be possible to control the read or write access, or both, to the policy database with the security features of a tamper resistant smart card.

Although the invention was described above with reference to the examples shown in the appended drawings, it is obvious that the invention is not limited to these, but may be modified by those skilled in the art without departing from the scope and spirit of the invention. It is, for example, possible to utilize the mechanism of the invention for purposes other than route optimization. Furthermore, should the standards vary, the implementation of the mechanism of the invention may be varied accordingly. Regarding Mobile IP, the Binding Update does not necessarily have to be transmitted when the care-of address changes, but it can also be sent periodically, for example. Consequently, the method can also be used in connection with a first periodic update when the mobile node stays at its location. It may also be possible to delegate the BU signaling or part of it to the network. The home agent could then contain the policy decision point and send the BU when needed, i.e. the home agent could authenticate the correspondent node in the above-described manner. However, instead of being located in the home agent, the above-described determination devices, which are responsive to the above authentication device, and the address update devices, which are responsive to the determination devices, may also be located in the mobile node, for example, even if the actual authentication means are located in the home agent. Even if the mechanism is mainly intended for Mobile IPv6, it may be utilized in connection with any protocol that allows a communicating peer to deduce the location of a node from a received message, thereby giving the node an option of prohibiting the process that allows such a deduction. It is therefore to be understood that the above use of terms common in a Mobile IP environment does not limit the environments in which the invention may be implemented. For example, a correspondent node here refers to any node or network entity communicating with the mobile node. Furthermore, various authentication or identification mechanisms may be utilized for obtaining the identity information about the correspondent node. These include mechanisms where the identity information is secured otherwise than cryptographically, such as DNS-based mechanisms.

The invention claimed is:

1. A method, comprising:
indicating that a correspondent registration process needs to be performed for a mobile node for which a home network registration process has been performed or needs to be performed with its home network, thereby to register current network address of the mobile node with the home network,
wherein the correspondent registration process includes transmitting a binding update to a correspondent node of the mobile node, wherein the binding update includes location-related information about the mobile node, and wherein the location-related information enables one of the correspondent node, or a third party to determine a geographic location of the mobile node within a certain accuracy;
authenticating the correspondent node in response to the indicating, the authenticating yielding identity information about the correspondent node;
determining whether the correspondent registration process is to be carried out, based on the identity information; and
performing the correspondent registration process when the determining indicates that the correspondent registration process is to be carried out and omitting the correspondent registration process when the determining indicates that the correspondent registration process is not to be carried out.

2. The method according to claim 1, wherein the performing performs the correspondent registration process for optimizing routing between the mobile node and the correspondent node.

3. The method according to claim 1, further comprising storing security policy data in the mobile node, the security policy data indicating a set of trusted parties.

4. The method according to claim 3, wherein the determining comprises comparing the identity information with the security policy data stored in the mobile node.

5. The method according to claim 4, wherein the performing is carried out in response to the comparing when the comparing indicates that the correspondent node belongs to the set of trusted parties.

6. The method according to claim 4, wherein the determining comprises prompting a user of the mobile node to make a decision when the comparing indicates that the correspondent node fails to belong to the set of trusted parties, wherein the prompting comprises informing the user about the identity information.

7. The method according to claim 1, wherein the indicating comprises indicating that the correspondent registration process comprises the binding update according to a mobile internet protocol.

8. The method according to claim 7, wherein the indicating is performed in response to a predetermined event.

9. The method according to claim 8, wherein the indicating comprises responding to the predetermined event comprising reception of a packet routed via a home agent of the mobile node.

10. The method according to claim 8, wherein the indicating comprises responding to the predetermined event comprising reception of a new address for the mobile node.

11. The method according to claim 3, wherein the storing comprises storing the security policy data comprising high-level identifiers of trusted correspondent nodes.

12. The method according to claim 3, wherein the storing comprises storing the security policy data comprising rules for deciding whether the identity information represents a trusted correspondent node.

13. The method according to claim 1, wherein the authenticating comprises authenticating the correspondent node using a certificate-based authentication protocol.

14. The method according to claim 13, wherein the authenticating comprises authenticating using the certificate-based authentication protocol comprising an internet key exchange protocol.

15. The method according to claim 13, wherein the authenticating comprises authenticating using the certificate-based authentication protocol comprising a transport layer security protocol.

16. The method according to claim 1, wherein the authenticating comprises authenticating using the authenticating comprising certifying the identity information cryptographically.

17. An apparatus, comprising:
an indicator configured to give an indication when a correspondent registration process needs to be performed;
a binding unit configured to transmit a binding update to a correspondent node,
wherein the correspondent registration comprises transmitting a binding update to the correspondent node, and wherein the binding update includes location-related information about the apparatus, and wherein the location-related information enables one of the correspondent node, or a third party to determine a geographic location of the apparatus within a certain accuracy;
an authenticator configured to authenticate the correspondent node, the authentication unit being responsive to the indicator and configured to yield identity information about the correspondent node;
a location privacy decision unit, responsive to the authenticator, configured to determine whether the correspondent registration process is to be performed; and
a correspondent registration unit, responsive to the location privacy decision unit, configured to carry out the correspondent registration process,
wherein the binding unit is further configured to perform a home network registration process with a home network of the apparatus, thereby to register current network address of the apparatus with the home network.

18. The apparatus according to claim 17, wherein the binding unit is further configured to maintain a binding, the binding being an association of a home address of the apparatus with a care-of address of the apparatus,
wherein the correspondent node is informed of the binding when the correspondent registration process is performed.

19. The apparatus according to claim 17, wherein the authenticator comprises a certificate-based authentication protocol.

20. The apoaratus according to claim 17, wherein the authenticator comprises a domain name system-based protocol for obtaining the identity information.

21. The apparatus according to claim 17, wherein the location privacy decision unit comprises a security policy database, the location privacy decision unit being configured to determine, by the security policy database, whether the correspondent registration unit can be activated without consulting a user of the apparatus.

22. The apparatus according to claim 21, wherein the location privacy decision unit further comprises a user interaction unit configured to prompt the user to make a decision on whether the correspondent registration process is to be performed.

23. The apparatus according to claim 22, wherein the user interaction unit is configured to indicate the identity information to the user, the identity information comprising a high-level identifier of the correspondent node.

24. The apparatus according to claim 21, wherein the security policy database comprises identifiers of trusted correspondent nodes.

25. The apparatus according to claim 21, wherein the security policy database comprises rules for determining whether a given identifier represents a trusted correspondent node.

26. The apparatus according to claim 17, further comprising a mobile node.

27. A system, comprising:
an indicator configured to give an indication when a correspondent registration process needs to be performed, location-related information about a mobile node being notified to a correspondent node of the mobile node if the correspondent registration process is performed;
a binding unit configured to transmit a binding update to the correspondent node,
wherein the correspondent registration includes transmitting a binding update to the correspondent node, and wherein the binding update includes location-related information about the mobile node, and wherein the location-related information enables one of the correspondent node, or a third party to determine a geographic location of the mobile node within a certain accuracy;
an authenticator configured to authenticate the correspondent node, the authenticator being responsive to the indicator and yielding identity information about the correspondent node;

a location privacy decision unit, responsive to the authenticator, configured to determine, based on the identity information, whether the correspondent registration process is to be performed; and a correspondent registration unit, responsive to the location privacy decision unit, configured to carry out the correspondent registration process, wherein the binding unit is further configured to perform a home network registration process with a home network of the mobile node, thereby to register current network address of the mobile node with the home network.

28. An apparatus, comprising:

indicator means for giving an indication when a correspondent registration process needs to be performed;

binding means for transmitting a binding update to the correspondent node and for performing a home network registration process with a home network of the apparatus, thereby to register current network address of the apparatus with the home network, wherein the correspondent registration includes transmitting a binding update to the correspondent node, and wherein the binding update includes location-related information about the apparatus, and wherein the location-related information enables one of the correspondent node, or a third party to determine a geographic location of the apparatus within a certain accuracy;

authentication means for authenticating the correspondent node, the authentication means being responsive to the indicator means and yielding identity information about the correspondent node;

location privacy decision means, responsive to the authentication means, for determining whether the correspondent registration process is to be performed; and correspondent registration means, responsive to the location privacy decision means, for carrying out the correspondent registration process.

* * * * *